US008443174B2

(12) United States Patent
Kim et al.

(10) Patent No.: US 8,443,174 B2
(45) Date of Patent: May 14, 2013

(54) PROCESSOR AND METHOD OF PERFORMING SPECULATIVE LOAD OPERATIONS OF THE PROCESSOR

(75) Inventors: Hong-Seok Kim, Seongnam-si (KR); Hee Seok Kim, Seoul (KR); Jeongwook Kim, Seongnam-si (KR); Suk Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 11/838,488

(22) Filed: Aug. 14, 2007

(65) Prior Publication Data

US 2008/0209188 A1 Aug. 28, 2008

(30) Foreign Application Priority Data

Feb. 22, 2007 (KR) .................. 10-2007-0017777

(51) Int. Cl.
*G06F 9/30* (2006.01)
*G06F 9/312* (2006.01)

(52) U.S. Cl.
USPC ........................................ 712/219; 712/225

(58) Field of Classification Search .................. 712/219, 712/233, 234, 225
See application file for complete search history.

(56) References Cited

U.S. PATENT DOCUMENTS

| | | | | |
|---|---|---|---|---|
| 5,586,295 A * | 12/1996 | Tran | ............................. | 711/137 |
| 5,611,063 A * | 3/1997 | Loper et al. | .................... | 712/205 |
| 5,621,694 A * | 4/1997 | Sakugawa et al. | ........ | 365/230.02 |
| 5,680,565 A | 10/1997 | Glew et al. | | |
| 5,689,679 A * | 11/1997 | Jouppi | .......................... | 711/122 |
| 5,710,912 A * | 1/1998 | Schlansker et al. | ........... | 712/220 |
| 5,740,419 A * | 4/1998 | Potter | ........................... | 712/241 |
| 5,864,692 A | 1/1999 | Faraboschi et al. | | |
| 5,875,464 A * | 2/1999 | Kirk | .............................. | 711/129 |
| 5,926,831 A | 7/1999 | Revilla et al. | | |
| 5,937,183 A * | 8/1999 | Ashar et al. | ..................... | 703/14 |
| 6,101,582 A * | 8/2000 | Arimilli et al. | .............. | 711/141 |
| 6,321,297 B1 * | 11/2001 | Shamanna et al. | ........... | 711/122 |
| 6,324,643 B1 | 11/2001 | Krishnan et al. | | |
| 6,338,133 B1 * | 1/2002 | Schroter | ....................... | 712/214 |
| 6,418,516 B1 * | 7/2002 | Arimilli et al. | .............. | 711/138 |
| 6,438,664 B1 * | 8/2002 | McGrath et al. | .............. | 711/154 |

(Continued)

FOREIGN PATENT DOCUMENTS

EP 1471421 A1 10/2004
JP 01300352 A * 12/1989

(Continued)

OTHER PUBLICATIONS

Tanenbaum, Andrew S. "Structured Computer Organization". Prentice-Hall, Inc. Second Edition. pp. 10-12.*
Murdocca, Miles J. and Heuring, Vincent P., Principles of Computer Architecture: Class Test Edition, © Aug. 1999, Prentice Hall, pp. 255-310.*
Patterson, David A. and Hennessy, John L., "Computer Architecture A Quantitative Approach", Morgan Kaufmann Publishers, Inc., Second Edition, © 1996, pp. 178-187.*

*Primary Examiner* — Aimee Li
(74) *Attorney, Agent, or Firm* — Sughrue Mion, PLLC (57) ABSTRACT

Provided is a processor and method of performing speculative load instructions of the processor in which a load instruction is performed only in the case where the load instruction substantially accesses a memory. A load instruction for canceling operations is performed in other cases except the above case, so that problems occurring by accessing an input/output (I/O) mapped memory area and the like at the time of performing speculative load instructions can be prevented using only a software-like method, thereby improving the performance of a processor.

13 Claims, 4 Drawing Sheets

U.S. PATENT DOCUMENTS

| | | |
|---|---|---|
| 6,463,579 B1 | 10/2002 | McKinsey |
| 6,542,966 B1 * | 4/2003 | Crawford et al. ............. 711/133 |
| 6,662,360 B1 * | 12/2003 | Hay et al. ...................... 717/131 |
| 6,918,030 B2 | 7/2005 | Johnson |
| 6,971,000 B1 * | 11/2005 | Sinharoy et al. .............. 712/239 |
| 7,103,755 B2 * | 9/2006 | Akiu et al. .................... 712/215 |
| 7,171,566 B2 * | 1/2007 | Durrant ......................... 713/189 |
| 7,421,567 B2 * | 9/2008 | Eickemeyer et al. ......... 712/219 |
| 2003/0061499 A1 * | 3/2003 | Durrant ......................... 713/189 |
| 2003/0167292 A1 | 9/2003 | Ross |
| 2004/0044874 A1 * | 3/2004 | Leach et al. .................. 711/220 |
| 2004/0095961 A1 * | 5/2004 | Brandt et al. .................. 370/469 |
| 2005/0108496 A1 * | 5/2005 | Elnozahy et al. ............. 711/203 |
| 2007/0168616 A1 * | 7/2007 | Jeddeloh ....................... 711/118 |

FOREIGN PATENT DOCUMENTS

| | | | |
|---|---|---|---|
| JP | 05094305 A | * | 4/1993 |
| KR | 100057817 B1 | | 12/1992 |
| KR | 1020010050693 A | | 6/2001 |
| KR | 1020010050791 A | | 6/2001 |
| KR | 1020020003882 A | | 1/2002 |
| WO | 9827485 A1 | | 6/1998 |

* cited by examiner

FIG. 2

| | | |
|---|---|---|
| 210 | 0 | r1 ← r2 + r3 |
| 220 | 1 | r4 ← r1 + 1 |
| 230 | 2 | beq r4, 3, L |
| 240 | 3 | r5 ← L1. mem [r4] |
| | 4 | |
| 250 | 5 | r6 ← r5 + 1 |
| | 6 | |

PROCESSOR AND METHOD OF PERFORMING SPECULATIVE LOAD OPERATIONS OF THE PROCESSOR

CROSS-REFERENCE TO RELATED APPLICATION

This application claims priority from Korean Patent Application No. 10-2007-0017777, filed on Feb. 22, 2007, in the Korean Intellectual Property Office, the entire disclosure of which is incorporated herein by reference.

BACKGROUND OF THE INVENTION

1. Field of the Invention

Methods and apparatuses consistent with the present invention relate to performing speculative load instructions of a processor. More particularly, apparatuses and methods consistent with the present invention relate to performing speculative load instructions of a processor and improving performance of the processor by a simple software-like improvement while the processor performs speculative load instructions without addition of a hardware.

2. Description of Related Art

A processor refers to a Central Processing Unit (CPU) and is a core device of a computer system which controls command words, interpretation, and processing of calculations, comparison, and the like, of data. The processor comprises a processor core which performs operation instructions, and a memory in which instructions and data to be processed by the processor core are stored.

The processor core fetches branch instructions from the memory and decodes the branch instructions when performing them.

In performing load instructions by a conservative method of a related art processor, no operation instruction is performed during an occurrence of a delay while the branch instruction is being performed. Thus, performance deterioration of the processor is caused for a period of time during an occurrence of a delay while the branch instruction is being performed.

Furthermore, in performing a speculative load instruction which has been suggested to solve problems occurred by the conservative method, when the load instruction is performed by a mis-speculative method, the processor core disadvantageously accesses a memory-mapped input/output (I/O) register which is mapped in a memory, thereby destroying data of an I/O device or inducing a generation of a page fault.

Also, in another related art method of performing a speculative load instruction, only load instructions to which an identifier is added are limitedly performed by a speculation method. In such a method, occurrence of an exception such as corruption of I/O data, or a page fault is determined by using a check instruction before using data values stored in a register. When no exception occurs, the data values stored in the register are normally used. However, when an exception occurs, the occurrence of the exception is handled through a method specified by the check instruction before using register values since fault data values would be stored in the register.

However, in the methods described above, there is a disadvantage in that since existence of an occurrence of an exception is stored and then a recovery instruction needs to be performed by using the check operation instruction at the time of occurrence of an exception, complex configuration is required in terms of hardware and a compiler, thereby generating additional cost.

Therefore, in accordance with the present invention, occurrence of an exception may be handled by only a simple software-like method when a load instruction is operated by a speculative method.

SUMMARY OF THE INVENTION

It is an aspect of the present invention to provide a processor capable of performing a speculative method by a software-like method while a branch instruction is being performed, in which the processor accesses an I/O mapped memory, and the like, for controlling an I/O device when the speculative method is performed and while the branch instruction is being performed, so that problems such as a malfunction of the I/O device, corruption of I/O data or deletion of I/O data can be solved, and performance improvement of a processor can be realized, to thereby obtain performance improvement of the processor without additional cost caused by additional hardware.

According to an aspect of the present invention, there is provided a method of performing speculative load instructions of a processor, which comprises: performing a branch instruction; receiving a load instruction; determining whether the load instruction is related to a physical memory area; and when the load instruction is related to the physical memory area, performing the load instruction during an occurrence of a delay while the branch instruction is being performed.

According to another aspect of the present invention, there is provided a processor which comprises: a processor core which performs a branch instruction and a load instruction; an input/output mapped memory which maps the processor to an input/output device; and a physical memory, wherein the processor core receives the load instruction, determines whether the load instruction is related to the physical memory area, and when the load instruction is related to the physical memory area, performs the load instruction during an occurrence of a delay while the branch instruction is being performed.

According to still another aspect of the present invention, there is provided a processor core which comprises: an instruction receiving unit for receiving a branch instruction and a load instruction; a memory area determining unit for determining whether the load instruction is related to a physical memory area; and a load instruction performing unit for performing, when the load instruction is related to the physical memory area, the load instruction during an occurrence of a delay while the branch instruction is being performed.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
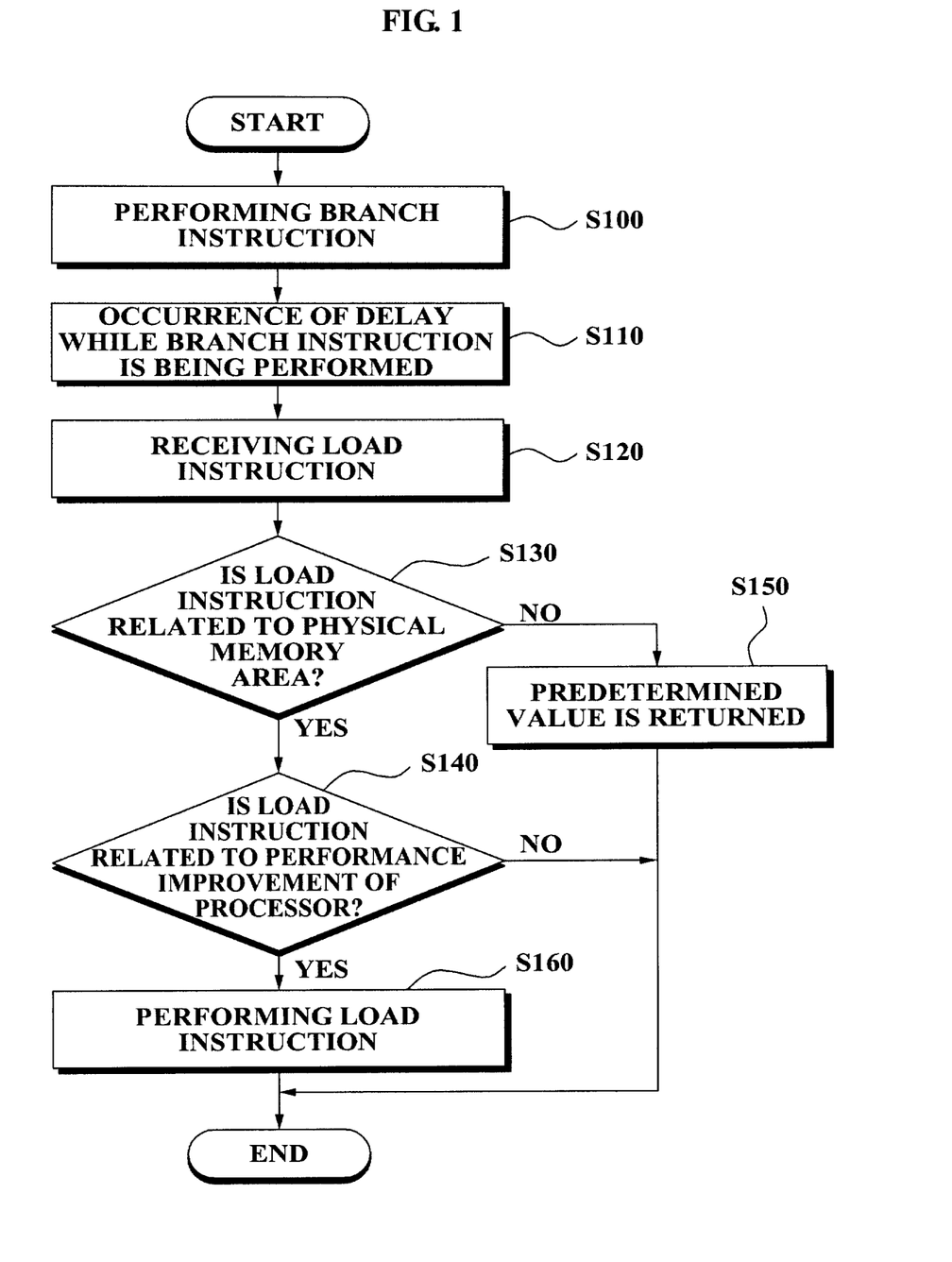
FIG. 1 is a flowchart illustrating a method of performing speculative load instructions of a processor according to an exemplary embodiment of the present invention.

FIG. 1 is a flowchart showing a method of performing speculative load instructions of a processor according to an exemplary embodiment of the present invention.

First, a processor performs branch instructions in operation S100. According to the present exemplary embodiment, the branch instructions are instructions relating to speculative load instructions which require a latency time to perform. That is, a delay occurs while the branch instruction is being performed in operation S110, and a load instruction is speculatively performed during the latency time, so that the entire period of time for which a processor requires to perform a series of operating instructions can be reduced.

When latency is generated while the branch instruction is being performed, a load instruction is received in operation S120. According to the present exemplary embodiment, the load instruction designates an instruction for reading values which have been stored in a specific address of a memory. Similarly, the load instruction is interpreted to include a series of instructions for reading out a predetermined data by accessing the memory.

In operation S130, it is determined whether the load instruction is related to a physical memory area. However, regardless of whether the load instruction is related to a physical memory area, the received load instruction is decoded. Particularly, the load instruction according to the present exemplary embodiment includes an identifier for identifying whether the load instruction accesses the physical memory area. Thus, a processor core of a computing device of the present invention may determine whether the load instruction is related to the physical memory area by using the identifier which is added to the load instruction.

The physical memory area according to the present exemplary embodiment designates an area which is not a virtual memory but a real memory in which any other additional effects are not generated when writing or reading a real value. The I/O mapped memory is not included in the physical memory area since it is an area for accessing an external device.

In general, a memory hierarchical structure includes a first to fourth hierarchy level. The first hierarchy designates a highest order hierarchy from among the multiple hierarchies, for a memory included in a processors and closest to a processor core and fastest in terms of access speed The second hierarchy corresponds to cache memory which is used to reduce the difference in processing speed between the process and the third hierarchy. The third hierarchy corresponds to main memory which is a space where programs and data intended to be performed on a process are stored The fourth hierarchy corresponds to auxiliary storage devices, such as a hard disk drive (HDD), a magnetic disk, and the like. Data providing speed of a memory corresponding to the physical memory area is fastest. The data providing speed of a memory area corresponding to the fourth hierarchy is slowest.

According to the present exemplary embodiment, under the memory hierarchical structure, it is determined whether the load instruction accesses the physical memory corresponding to the first hierarchy.

The processor core according to the present exemplary embodiment determines whether the load instruction belongs to the physical memory area, and then performs only load instructions corresponding to the physical memory area which is not the I/O mapped memory area capable of accessing an I/O device. Therefore, access to the I/O mapped memory area which is not the physical memory area is previously interrupted so that occurrence of an undesired error can be prevented.

When the load instruction is not related to the physical memory area, an operation instruction which has been processed is normally performed by returning a predetermined value in operation S150.

A method of performing operations of a processor according to the present exemplary embodiment further includes determining whether performance improvement of the processor can be expected by the load instruction, in operation S140, while the method is being applied by the speculative method, even when the load instruction is related to the physical memory area. Accordingly, when the load instruction is not related to the performance improvement of the processor, a performance is not applied, thereby reducing undesirable resource use or power consumption.

As described above, when the received load instruction is related to the physical memory area and related to the performance improvement of the processor at the time of performing the load instruction, a performance generated by the speculative method, namely, a load instruction is performed in operation S160.

Specifically, in the case where a delay for performing instructions at the time of performing the branch instruction is generated, the processor core receives the load instruction and then determines whether the load instruction is related to the physical memory area by using an identifier identifying load instructions corresponding to the physical memory area. Thus, when the load instruction is related to the physical memory area, the load instruction is performed by the speculative method, thereby enabling the load instruction to be performed during a delay time generated while the branch instruction is being performed.

Also, when it is determined that the load instruction is not related to the physical memory area, a given value is returned and instructions are not performed by the speculative method. As a result, an exception, such as accessing data relating to an I/O device, by unnecessarily accessing the I/O mapped memory area is not generated.

Accordingly, the load instruction is performed by the speculative method during a delay time occurring while the branch instruction is being performed, thereby increasing efficiency of the operation method of a processor.

Particularly, in the operation method of a processor according to the present exemplary embodiment, the speculative method is performed only through a software-like configuration, whereby an additional cost which might be generated due to adding settings in terms of hardware is not required.

Furthermore, an operation method according to the present exemplary embodiment includes a computer-readable recording medium storing a program for implementing the operation method of a processor described with reference to FIG. 1.

The operation method according to the present exemplary embodiment is implemented in program instruction form that can be generated through a variety of computer means, so as to be recorded on a computer-readable medium. The computer-readable medium may include program instructions, data files, a data structure or a combination thereof The program instructions recorded in the computer-readable medium may be specially designed and constructed for the present invention, or be well known to those skilled in the field of computer software. Examples of computer-readable mediums include magnetic media such as hard disks, floppy disks, and magnetic tape; optical media such as compact disc (CD) read-only memories (ROMs) and digital versatile discs (DVDs); magneto-optical media such as optical disks; and hardware devices that are specially configured to store and perform program instructions, such as ROM, random access memory (RAM), flash memory, and the like. Examples of program instructions include both machine code, such as that produced by a compiler, and files containing higher level code that may be executed by the computer using an interpreter. The hardware devices may be constructed to act as one or more software modules for performing the operation of the present invention, and vice versa.

Figure 2:
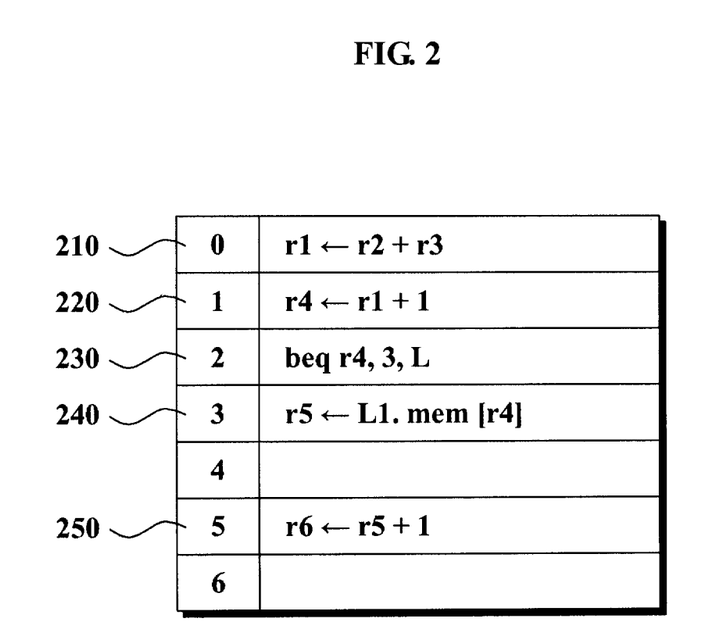
FIG. 2 illustrates a sequential flow of an instruction code for performing speculative load instructions of a processor according to an exemplary embodiment of the present invention.

FIG. 2 illustrates a sequential flow of an instruction code for performing speculative load instructions of a processor according to an exemplary embodiment of the present invention.

As shown in FIG. 2, from the compared result of register values, memory values corresponding to the physical memory area are loaded during a delay time occurring while the branch instruction is being performed.

In operation 210, a value in a second register (r2) and a value in a third register (r3) are added, and the result is stored in a first register (r1). Next, in operation 220, the value in the first register (r1) is incremented by 1, and the result is stored in a fourth register (r4). In operation 230, the fourth register (r4) is compared with a predetermined value of 3, and then branches to a predetermined location "L" according to an instruction "beq". Here, a delay corresponding to one step is generated while branching to the location "L" when performing the instruction "beq", depending on a result of the comparison of the fourth register (r4).

In performing a related art speculative method used when the branch instruction is performed, no instruction is performed during a delay time period corresponding to one step. Further, in the case where a load instruction is performed by another related art speculative method when the branch instruction is performed, existence of an occurrence of an exception during performing the load instruction is determined in advance so as to store required information, and then the load instruction is performed. As a result, additional hardware is required.

However, according to the present exemplary embodiment, since the load instruction includes an identifier for identifying whether the load instruction is performed by the speculative method, software determines an identifier, thereby improving efficiency of a processor without additional hardware.

Specifically, as shown in operation 240 of FIG. 2, an identifier "L1" is added to a load instruction for reading the memory value referred to by the fourth register (r4), thereby indicating that load instruction corresponds to the physical memory area. Accordingly, the identifier "L1" identifies whether the load instruction corresponds to the physical memory area. In this instance, the load instruction is performed such that the memory value corresponding to the fourth register (r4) during the delay time period of the branch instruction is transmitted to a fifth register (r5) only when the load instruction is related to the physical memory area.

Thus, the load instruction is performed only when the fourth register (r4) corresponds to the physical memory area. Thus, when the fourth register is different from the physical memory area, such as I/O mapped memory, the load instruction is not performed, so that a page fault is not generated.

That is, in a case where the identifier "L1" is not included in the load instruction, the load instruction is not performed, and thus an occurrence of exception, such as page fault, can be interrupted.

Thereafter, when the load instruction is completed, in operation 250, the value in the first register (r5) is incremented by 1, and the result is stored in a sixth register (r6).

Figure 3:
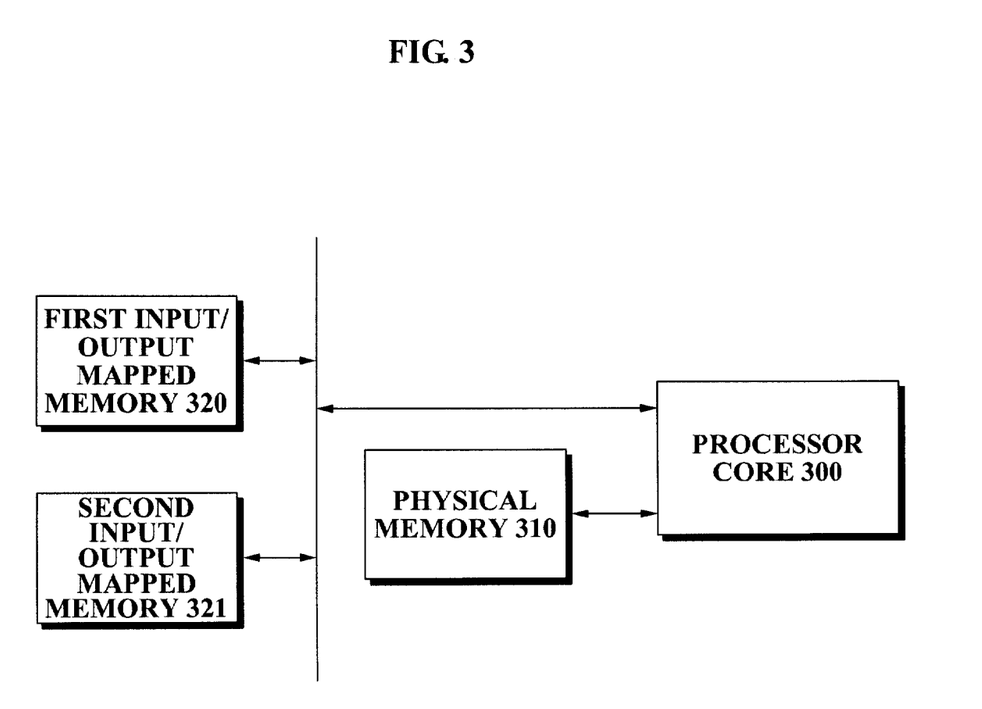
FIG. 3 is a configuration diagram of a processor according to an exemplary embodiment of the present invention.

FIG. 3 is a configuration diagram of a processor according to an exemplary embodiment of the present invention.

As shown in FIG. 3, a processor core 300 according to the present exemplary embodiment includes a physical memory 310 and I/O mapped memories 320 and 321.

The I/O mapped memories 320 and 321 can be constituted by a first and a second I/O mapped memories. The I/O mapped memories 320 and 321 are memories capable of correspondingly accessing an I/O device, so that the processor core 300 controls the I/O device. Thus, the I/O mapped memories 320 and 321 access the I/O device to allow the processor core to control the I/O device.

However, when the processor core performs the load instruction through the speculative method and accesses the I/O mapped memories 320 and 321, an exception such as page fault or malfunction of the I/O device is unnecessarily generated. Also, severe problems such as corrupting or deleting I/O data may occur.

Therefore, according to the present exemplary embodiment, the processor core 300 is prevented from accessing the I/O mapped memory 320 and 321 in advance, thereby preventing the occurrence of exceptions, as described above, from being generated.

The physical memory 310 is included in a processor and corresponds to the first hierarchy memory area which is a highest order hierarchy from among the multiple hierarchies. The physical memory 310 corresponding to the first hierarchy memory area is data memory which is closest to the processor core 300 and accesses the processor core 300 the fastest.

The processor core 300 designates a device for performing substantial operations in a processor, which performs operations, such as fetching branch instructions from memory to decode, performs the decoded instructions, and then reflects the performed result thereon.

The processor core 300 according to the present exemplary embodiment receives load instructions and determines whether the received load instructions are related to the physical memory area 310. More particularly, the processor core 300 determines whether load instructions access the physical memory area 310.

Since the determination of whether the load instructions are related to the physical memory area 310 is made by using an identifier added to the load instructions, the processor core 300 determines whether the identifier is included in the load instruction. Here, the identifier identifies whether the load instruction accesses the physical memory area 310. When the identifier is included in the load instruction, the load instruction is determined to access the physical memory area 310, whereby the load instruction is performed.

In the processor core 300, when the load instruction does not include the identifier indicating that the load instruction is related to the physical memory area 310, a predetermined value is returned instead of performing the load instruction, so that an operation instruction where a delay is generated can be normally performed.

Furthermore, the processor core 300 determines whether performance improvement of a processor can be expected when a performance is applied by a speculative method. As a result, undesirable resource use or power consumption caused when the speculative method is performed and when performance improvement of a processor is not expected, can be prevented.

Figure 4:
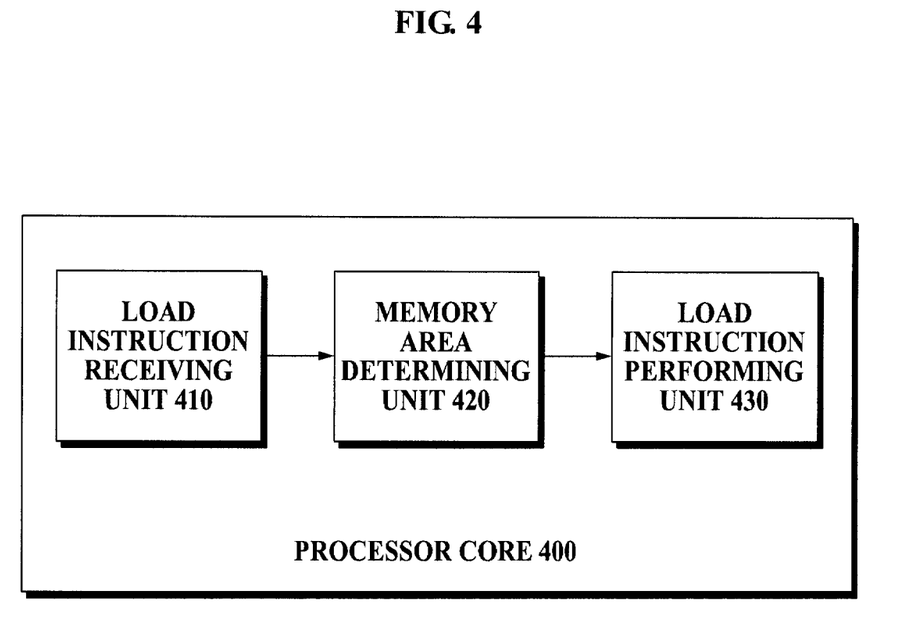
FIG. 4 is a configuration diagram of a processor core according to an exemplary embodiment of the present invention.

FIG. 4 is a configuration diagram of a processor core according to an exemplary embodiment of the present invention. As shown in FIG. 4, a processor core 400 according to the present exemplary embodiment includes a load instruction receiving unit 410, a memory area determining unit 420, and a load instruction performing unit 430.

The load instruction receiving unit 410 fetches, from a memory, a load instruction to be performed, and provides the fetched load instruction to the memory area determining unit 420.

The memory area determining unit 420 determines whether the load instruction is related to the physical memory area. The memory area determining unit 420 determines that the identifier identifying whether the load instruction accesses the physical memory area is included in the load instruction. In this regard, when the load instruction includes the identifier, the memory area determining unit 420 determines that the load instruction accesses the physical memory area.

Also, when the memory area determining unit 420 determines that the load instruction does not access the physical memory area, a predetermined value is returned instead of performing the load instruction, thereby normally performing an operation instruction which is intended to be performed during a delay time period preceding performance of load instruction.

The memory area determining unit 420 also determines whether performance improvement of a processor can be expected when the load instruction is performed, thereby preventing undesirable resource use or power consumption.

The load instruction performing unit 430 performs a load instruction when the memory area determining unit 420 determines that the load instruction will access the physical memory area.

Accordingly, when a delay for performing instructions while the branch instruction is being performed is generated, the load instruction is received, and it is determined whether the load instruction is related to the physical memory area, by using the identifier of the load instruction identifying the load instruction which is related to the physical memory area. As a result, when the load instruction is related to the physical memory area, the load instruction is performed by a speculative method, thereby enabling the load instruction to be performed during a delay time generated while the branch instruction is being performed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of performing speculative load instructions of a processor, the method comprising:
performing a branch instruction;
receiving a speculative load instruction;
determining whether the speculative load instruction is related to a physical memory area;
if the speculative load instruction is related to the physical memory area according to the determining, performing the speculative load instruction during an occurrence of a delay while the branch instruction is being performed; and
if the speculative load instruction is related to a memory area that is not the physical memory area according to the determining, not performing the speculative load instruction during the occurrence of the delay,
wherein the physical memory area corresponds to a first hierarchy memory area which is a highest order hierarchy from among multiple hierarchies,
wherein the determining comprises determining whether the speculative load instruction includes an identifier, distinct from a memory address, for identifying that the speculative load instruction accesses the physical memory area, and
wherein the determining further comprises determining whether the speculative load instruction is related to the physical memory area based on the identifier and whether the speculative load instruction is related to a performance improvement of the processor.

2. The method of claim 1, wherein, if the speculative load instruction is not related to the physical memory area, a value is returned instead of performing the speculative load instruction.

3. The method of claim 1, wherein the performance improvement of the processor is a reduction of at least one of resource use and power consumption.

4. The method of claim 1, wherein the speculative load instruction is related to the physical memory area if the speculative load instruction accesses the physical memory area.

5. The method of claim 1, wherein the performing the speculative load instruction comprises, if the speculative load instruction is related to the physical memory area and the performance improvement of the processor according to the determining, performing the speculative load instruction during the occurrence of the delay while the branch instruction is being performed.

6. The method of claim 1, wherein the not performing the speculative load instruction comprises, if the speculative load instruction is related to an input/output mapped area for accessing an external device, not performing the speculative load instruction during the occurrence of the delay.

7. A non-transitory computer-readable recording medium storing a program for implementing a method of performing speculative load instructions of a processor, the method comprising:
performing a branch instruction;
receiving a speculative load instruction;
determining whether the speculative load instruction is related to a physical memory area; and
if the speculative load instruction is related to the physical memory area according to the determining, performing the speculative load instruction during an occurrence of a delay while the branch instruction is being performed; and
if the speculative load instruction is related to a memory area that is not the physical memory area according to the determining, not performing the speculative load instruction during the occurrence of the delay,
wherein the physical memory area corresponds to a first hierarchy memory area which is a highest order hierarchy from among multiple hierarchies,
wherein the speculative load instruction includes an identifier, distinct from a memory address, for identifying that the speculative load instruction accesses the physical memory area, and wherein the determining comprises determining whether the speculative load instruction is related to the physical memory area based on the identifier and whether the speculative load instruction is related to a performance improvement of the processor.

8. A processor comprising:
a processor core which performs a branch instruction and a speculative load instruction;
an input/output mapped memory which maps the processor to an input/output device; and
a physical memory,
wherein the processor core receives the speculative load instruction, determines whether the speculative load instruction is related to the physical memory area, if the speculative load instruction is related to the physical memory area according to the determining, performs the speculative load instruction during an occurrence of a delay while the branch instruction is being performed, and if the speculative load instruction is related to a memory area that is not the physical memory area according to the determining, does not perform the speculative load instruction during the occurrence of the delay,
wherein the physical memory corresponds to a first hierarchy memory area which is a highest order hierarchy from among multiple hierarchies,
wherein the speculative load instruction includes an identifier, distinct from a memory address, for identifying that the speculative load instruction accesses the physical memory area, and
wherein the processor core determines whether the speculative load instruction is related to the physical memory area based on the identifier and further determines whether the speculative load instruction is related to a performance improvement of the processor.

9. The processor of claim 8, wherein, if the speculative load instruction is not related to the physical memory area, the processor core returns a value instead of performing the speculative load instruction.

10. The processor of claim 8, wherein the speculative load instruction is related to the physical memory area if the speculative load instruction accesses the physical memory area.

11. A processor core comprising:
an instruction receiving unit which receives a branch instruction and a speculative load instruction;
a memory area determining unit which determines whether the speculative load instruction is related to a physical memory area; and
a speculative load instruction performing unit which performs, if the speculative load instruction is related to the physical memory area according to the determining, the speculative load instruction during an occurrence of a delay while the branch instruction is being performed, and does not perform, if the speculative load instruction is related to a memory area that is not the physical memory area according to the determining, the speculative load instruction during the occurrence of the delay,
wherein the physical memory area corresponds to a first hierarchy memory area which is a highest order hierarchy from among multiple hierarchies,
wherein the speculative load instruction includes an identifier, distinct from a memory address, for identifying that the speculative load instruction accesses the physical memory area, and
wherein the memory area determining unit determines whether the speculative load instruction is related to the physical memory area based on the identifier and further determines whether the speculative load instruction is related to a performance improvement of the processor.

12. The processor core of claim 11, wherein, if the speculative load instruction is not related to the physical memory area, the memory area determining unit returns a value instead of performing the speculative load instruction.

13. The processor core of claim 11, wherein the speculative load instruction is related to the physical memory area if the speculative load instruction accesses the physical memory area.

* * * * *